United States Patent [19]

French

[11] Patent Number: 4,486,863
[45] Date of Patent: Dec. 4, 1984

[54] CIRCULAR SEISMIC ACQUISITION SYSTEM

[75] Inventor: William S. French, Covington, La.

[73] Assignee: Tensor Geophysical Service Corporation, Metairie, La.

[21] Appl. No.: 522,329

[22] Filed: Aug. 11, 1983

[51] Int. Cl.³ ............................................ G01V 1/38
[52] U.S. Cl. .................................. 367/15; 367/130; 367/19; 367/117; 367/16
[58] Field of Search .................. 367/15, 16, 19, 20, 367/21, 17, 117, 106, 130, 14

[56] References Cited

U.S. PATENT DOCUMENTS

| | | | |
|---|---|---|---|
| 3,292,141 | 12/1966 | Hines et al. | 367/21 |
| 3,806,863 | 4/1974 | Tilley et al. | 367/21 |
| 3,831,136 | 8/1974 | Sagoci | 367/21 |
| 3,840,845 | 10/1974 | Brown | 367/17 |
| 3,890,593 | 6/1975 | Davis | 367/20 |
| 3,921,124 | 11/1975 | Payton | 367/17 |
| 4,033,278 | 7/1977 | Waters | 367/17 |
| 4,068,208 | 1/1978 | Rice, Jr. et al. | 367/19 |
| 4,231,111 | 10/1980 | Neeley | 367/19 |
| 4,301,523 | 11/1981 | Meland et al. | 367/19 |
| 4,376,301 | 3/1983 | Roberts | 367/20 |
| 4,404,664 | 9/1983 | Zachariadis | 367/19 |

Primary Examiner—Nelson Moskowitz
Assistant Examiner—Ian J. Lobo
Attorney, Agent, or Firm—Vaden, Eickenroht, Thompson, Bednar & Jamison

[57] ABSTRACT

A marine seismic survey is disclosed in which a plurality of steerage centers are selected for circular traversal thereabout by a marine vessel towing a streamer cable. While the vessel and the streamer are following a circular track about a steerage center, the feathering of the cable creates a separate concentric track line for each of the mid-points between the receivers included in the cable and the source. In this manner an areal coverage is assured which requires no reliance on unpredictable and uncontrollable currents for the desired feathering. An additional important feature of the current disclosure is that there is little wasted time in which the survey vessel moves outside of the overall surveyed area. A preferred course tracking for the vessel is to move from the arc of one steerage course line to another in tangential fashion.

6 Claims, 4 Drawing Figures

CIRCULAR SEISMIC ACQUISITION SYSTEM

BACKGROUND OF THE INVENTION

1. Field of the Invention

This invention pertains to marine seismic acquisition procedures employing a towed streamer cable having a plurality of data receivers spaced therealong.

2. Description of the Prior Art

Marine seismic reflection surveys are traditionally developed by steering a marine vessel in a straight line while periodically firing an acoustic source closely associated with the vessel, usually towed just behind the vessel and positioned slightly below the surface of the water. A streamer cable towed by the vessel is also played out behind the vessel. The cable includes along its length a plurality of suitable acoustic receivers known as hydrophones for receiving and detecting acoustic seismic reflections. The hydrophones are normally clustered or grouped together, the groups of receivers usually being evenly spaced along the cable. The data gathered by the receivers reveals the condition of the geophysical terrain between the source and the respective receivers as the source is fired and the vessel traverses its course.

The processing of the developed data initially assumed that the ship, the source and the respective receivers spaced along the streamer cable were all located in a straight line with respect to the sea floor.

However, it was obvious that in practice, sea and wind currents caused the streamer cable to "feather" to one side or the other and not be towed directly behind the vessel. Therefore, the data line of tow for each of the data gathering elements had to be corrected for this feathering phenomenon or some erroneous data results would occur.

It was recognized, however, that when feathering did occur, there was an effective areal coverage to the data, rather than just a linear coverage. That is, the receivers tracked along parallel lines, and the mid-points, (assuming horizontal reflection layers in the terrain) between the source and the respective receivers also tracked parallel lines. Hence, schemes were developed to select line spacing, ship heading and speed with respect to the currents to take advantage of the areal coverage caused by feathering. Complex positioning schemes were developed to determine the actual location of each "receiver", which is understood to apply herein to what is really a group of individual receiver detectors, of the streamer. The design of surveys (line spacing, shooting direction and speed, number of lines, etc.) was made based upon assumptions of the currents.

The details of the ocean currents and, hence, the true streamer configuration are unfortunately unpredictable. Many surveys have failed to provide adequate areal coverage when based on predicted currents because the actual feathering of the streamer cable during the survey departed significantly from what was expected before the survey. To overcome the bad experience resulting from erratic feathering, acquisition of data has been performed by positioning the receivers and by tracking adjacent shot line courses of the vessel much closer together than is actually required by data processing. Of course, this significantly increases the cost of data acquisition in order to insure an adequate distribution of receiver locations over a surveyed area.

As mentioned above, areal marine seismic reflection surveys are presently conducted using a number of substantially equally spaced parallel vessel course lines. Usually, one-half of the lines are shot in one direction and one-half of the lines are shot in the opposite direction. Thus, upon finishing the shooting along one line, for example, west to east, the marine vessel comes about and a line is shot from east to west. The turns are made outside of the area of interest for the survey in order to acquire data from the entire area of interest. The time that the vessel is outside of the survey area represents wasted ship time as far as data acquisition is concerned.

Therefore, it is a feature of the present invention to gather marine seismic data in an improved manner wherein feathering of the streamer cable is controlled independently of sea and wind currents to insure accuracy of areal coverage.

It is another feature of the present invention to provide for the gathering of marine seismic data in an improved manner wherein the marine vessel rarely traverses outside of the area of survey interest during the taking of the survey and, therefore, there is little waste time as with prior art surveys, when the vessel is coming about.

SUMMARY OF THE INVENTION

The preferred method of gathering marine seismic data disclosed herein employs a marine vessel having associated therein a marine seismic source and a streamer cable having hydrophone or similar seismic receivers spaced therealong, in conventional fashion. Steerage centers are determined throughout the survey area. The vessel then tracks in at least partial circular arcs about such centers while creating seismic signals and detecting or receiving seismic reflections at each of the receivers along the streamer cable. Assuming horizontal geophysical reflecting properties, the mid-points between the source and each of the receivers track a circular or arcuate line about the steerage center, each mid-point tracking a slightly different concentric arc to thereby give areal coverage. The limits of the areal coverage about a single steerage center is determined by the line tracked by the mid-point between the source and the rearmost receiver carried by the cable.

Unpredictable ocean and wind currents will produce variations in ship and streamer positioning from the ideal circular design, but those variations will have a minor effect. The actual position of ship and streamer are recorded during the survey using commercially available technology, and such position information is used to correct the recorded data during subsequent processing.

Although it is acceptable to complete a circumferential circular coverage about a first steerage center and then the next until a complete areal survey has been taken, a preferred manner is to steer the vessel first partly around one center and then, in a tangential continuum around a successive steerage center in "S" like fashion and so forth until the entire area is covered. This is believed to be the quickest and easiest way to obtain comprehensive coverage of the entire survey area.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope as the invention may admit to other equally effective embodiments.

In the Drawings.

DESCRIPTION OF THE PREFERRED EMBODIMENT

Figure 1:
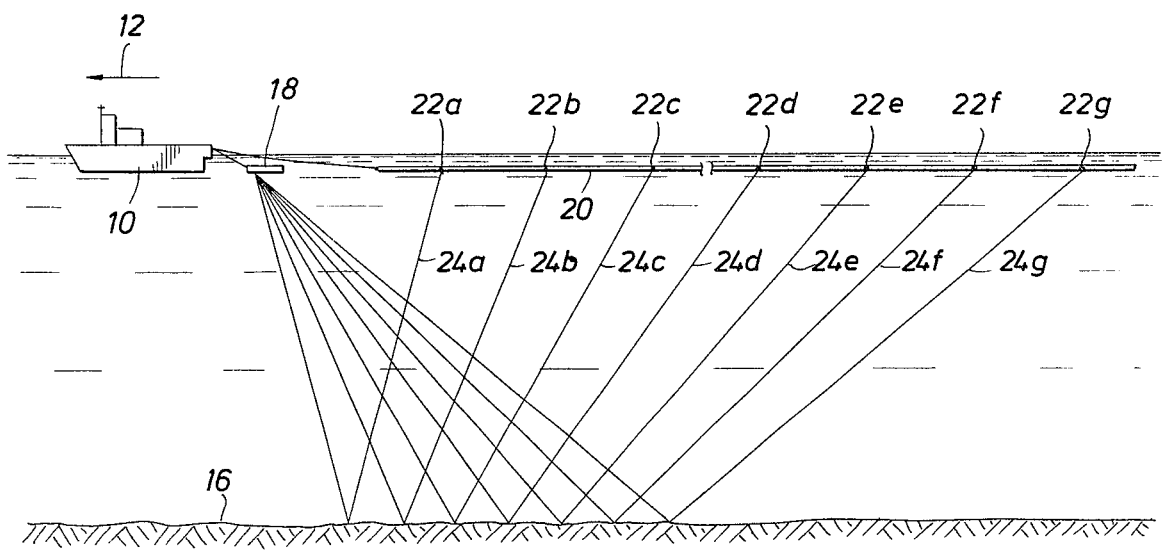
FIG. 1 is a schematic representation of a marine vessel equipped for seismic data survey gathering using a streamer cable.

Now referring to the drawings, and first to FIG. 1, a marine vessel 10 is shown moving in a path direction 12. The surface of the sea or ocean water is identified as surface 14 and the geophysical terrain is represented by reflecting surface 16. This surface is illustrated as being horizontal and is shown only as a single reflecting interface for convenience of illustration. Of course, it is understood that in actual practice there will be many reflecting interfaces and one or more of them may not be predominantly horizontal. Marine vessel 10 tows a floating source 18, usually about 25 feet below the surface of the water and close to the vessel, and a streamer cable 20, which is balanced and otherwise positioned by paravanes and the like so that it plays out behind the vessel also below the water surface, and therefore, free from most of the surface turbulence.

Located along and integral with streamer cable 20 are a plurality of "receivers". A "receiver" for purposes of this application is a seismic signal detection unit. In actual practice each unit is an array or group of closely associated hydrophones, but a unit can be a single hydrophone. The receivers are normally evenly spaced from one another. The streamer cable can be quite long, on the order of two miles long in many instances. For simplicity of illustration only a few of receivers 22a–22g are shown. The respective reflection paths from source 18 to reflecting surface 16 to receivers 22a–22g are identified as paths 24–24g.

In taking a survey, the source is periodically activated to produce an acoustic signal emanating downward into the water to be detected by the receivers after reflecting from the reflecting interfaces in the geophysical terrain. The acquired data is recorded and processed to reveal information about the geology of the formation at the reflecting points, which are the mid-points between the source and the respective receivers when viewed from above and for a horizontal reflecting layer or interface. Although the reflecting layer may be other than horizontal, for convenience the reflecting points will be referred to herein as the "mid-points".

Figure 2:
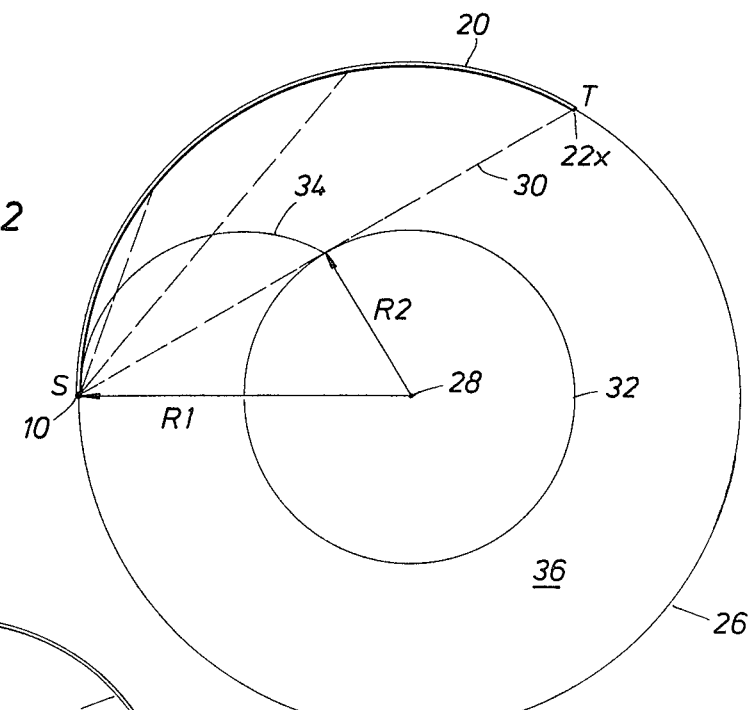
FIG. 2 is a simplified areal path of a marine vessel moving around a steerage center in accordance with the present invention.

Now referring to FIG. 2, an areal or top view of a vessel 10 is shown moving on a circular course 26 about a steerage center 28, streamer cable 20 feathering behind vessel 10 and approximately overlying course 26. The radius of the circle or the arc of the circle of course 26 is radius R1. A chord line 30 drawn from vessel 10, or more accurately from source 18 associated with vessel 10, to end receiver 22x, the one fartherest from vessel 10, defines a circle 32 which is traversed by the mid-point associated with receiver 22x. This mid-point course 32 can be determined by drawing a perpendicular to steerage point 28 to chord line 30, that perpendicular also being illustrated as radius R2.

It may be seen that other chord lines drawn to the intermediate receivers located along the streamer cable define a locus of points illustrated by line 34. It is also apparent that the line tracked by the mid-points all slightly differ from each other because of the feathering action, but are all concentric with one another about steerage center 28. The knowledge of the relationships just described of source, receivers, course radius, mid-point radii and the locus of points of the mid-point radii make it quite easy to accurately design a survey to cover a given area and to process and interpret the seismic data collected. It will be apparent that the areal coverage for a complete traversal about steerage point 28 is area 36, that area defined as being between course line 26 and mid-point course line 32.

Figure 3:
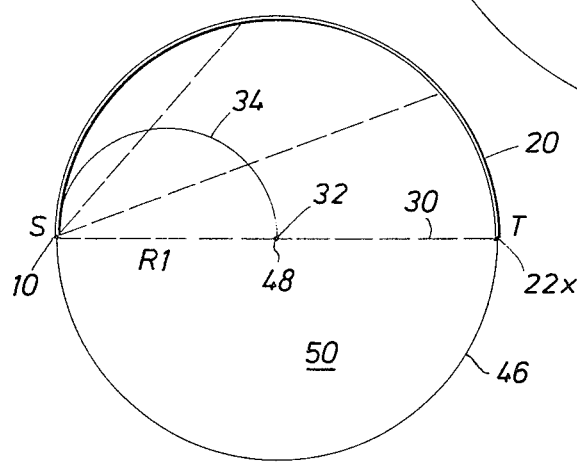
FIG. 3 is a simplified areal path of a marine vessel moving around a steerage center in accordance with another embodiment of the present invention.

FIG. 3 is similar in all respects to FIG. 2 except that R1, the radius of the circle of course 46, is chosen so that the length of the streamer cable equals one-half of the circumference of circular course 46. In this case, the mid-point 32 associated with receiver 22x coincides with the steerage center 48. The areal coverage for a complete traversal about steerage point 48 is area 50, the area swept out by the locus of mid-points or arc 34. Area 50 coincides with the complete area within circular course 46.

Figure 4:
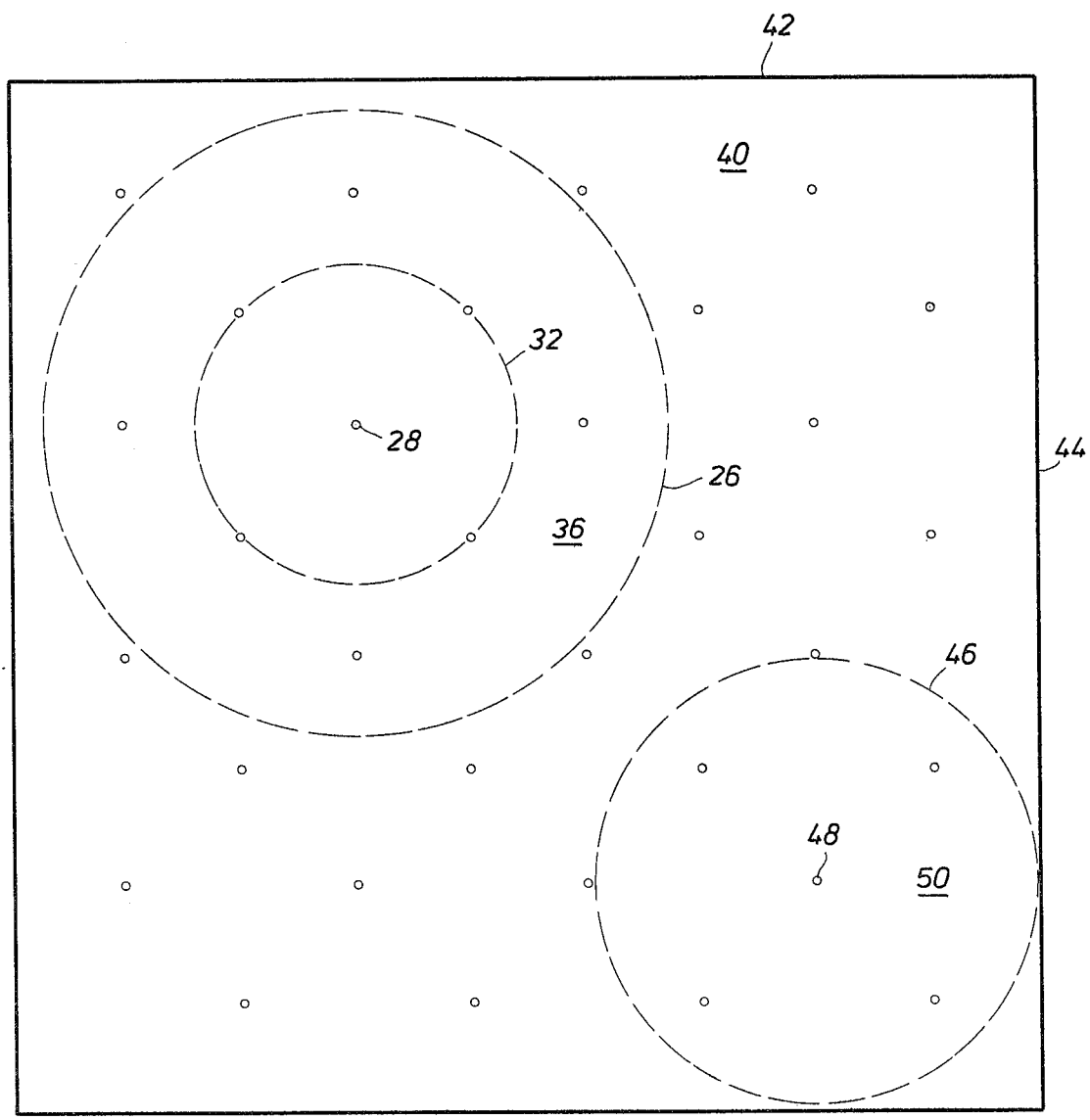
FIG. 4 is an areal survey plan for an entire area of interest in accordance with the present invention.

Now referring to FIG. 4, a planned area 40 for surveying is illustrated as a square with sides 42 and 44. Although an area surveyed is commonly a square, the present invention is equally applicable to a rectangular area or even an irregularly shaped area.

Areal coverage 36 between course line 26 and mid-point course line 32 and areal coverage 50 between course line 46 and steerage center 48 are superimposed on survey area 40 in FIG. 4. It may be seen that complete coverage of area 40, including repetitive data to give redundancy accuracy, is possible by selecting an appropriate radius R1 and by tracking similar courses about a multiplicity of steerage centers illustrated with the dot pattern shown. Each dot represents a steerage center. The desired redundancy achieved includes reflections from the same subsurface point from several source-receiver pairs with various distances between source and receiver and various azimuths of a line connecting source and receiver. There is some movement of the vessel outside of the boundries of the surveyed area, but nothing as compared with the prior art technique described above.

In order to most expeditiously cover or track area 40 in accordance with the above individual procedure, it is convenient to establish the steerage centers and the radius of steerage so that the vessel can move from one steerage course to the next in "S" fashion. In other words, the course setting would be tangential to one another to permit the vessel to weave an overall tangential course from an arc of one course line to the next until the complete area is covered.

While a particular embodiment of the invention has been shown and described, it will be understood that the invention is not limited thereto, since many modifications may be made and will become apparent to those skilled in the art.

1. The method of gathering marine seismic data employing a streamer cable towed by a marine vessel, said streamer cable having a plurality of seismic receivers spaced therealong, each of said receivers receiving seismic reflections resulting from an acoustic source associated with said marine vessel being received by said receiver after being reflected by the geophysical terrain located between said source and said receiver, which comprises
   traversing as closely as navigational techniques, wind and current conditions permit at least a partial circle with said marine vessel about a steerage center,
   creating acoustic source signals from said source, and
   receiving reflected signals from said source at at least one of said receivers, said receiver tracking a feathered course about said steerage center, the data gathered therefrom being that which is associated with the midpoint of a subtending moving chord defined by said source and said receiver.

2. The method of accordance with claim 1, and including
   receiving reflected signals from said source at each of the other of said receivers, each of said receivers tracking a respectively feathered course about said steerage center, the data gathered being that which is associated with an areal coverage between the circle arc traversed by said marine vessel and the subtending moving chord defined by said source and the one of said receivers located fartherest therefrom along the streamer cable, the mid-points of each of the subtending moving chords defined by said source and said receivers traversing separate circular arcs about said steerage center.

3. The method in accordance with claim 2, and
   processing the received data from the receivers recognizing that said mid-points of each of the subtending moving chords define a uniformly shaped locus of points.

4. The method in accordance with claim 2, and including
   traversing additional circle arcs with said marine vessel about additional steerage centers,
   creating acoustic source signals from said source, and
   receiving reflected signals from said source at each of said receivers, each of said receivers tracking a respectively feathered course about said additional steerage centers, the data gathered being that which is associated with additional areal coverages between the additional circle arcs traversed by said marine vessel and the subtending moving chords defined by said source and said receivers located along the streamer cables, the mid-points of each of the subtending moving chords defined by said source and said receivers traversing a circle arc about said additional steerage centers.

5. The method in accordance with claim 4, wherein said areal coverages combine to provide data gathering from a complete survey area.

6. The method in accordance with claim 4, and including
   locating the additional steerage centers and the radii of said traversed arcs for tangential interfacing, and
   moving said marine vessel about one of said steerage centers on a first circle arc course and then continuing about a second steerage center on a second circle arc course.

* * * * *